(12) United States Patent
Von Herzen et al.

(10) Patent No.: US 9,557,079 B2
(45) Date of Patent: Jan. 31, 2017

(54) SYSTEM AND METHOD FOR STORING THERMAL ENERGY

(75) Inventors: Brian Von Herzen, Minden, NV (US); Scott Raymond Frazier, Morrison, CO (US)

(73) Assignee: Bright Energy Storage Technologies, LLP, Arvada, CO (US)

( * ) Notice: Subject to any disclaimer, the term of this patent is extended or adjusted under 35 U.S.C. 154(b) by 847 days.

(21) Appl. No.: 13/183,266

(22) Filed: Jul. 14, 2011

(65) Prior Publication Data

US 2012/0012276 A1 Jan. 19, 2012

Related U.S. Application Data

(60) Provisional application No. 61/364,364, filed on Jul. 14, 2010, provisional application No. 61/364,368, filed on Jul. 14, 2010.

(51) Int. Cl.
*F24J 3/08* (2006.01)

(52) U.S. Cl.
CPC ............... *F24J 3/086* (2013.01); *Y02E 10/16* (2013.01); *Y02E 10/34* (2013.01)

(58) Field of Classification Search
CPC .... Y02E 60/142; Y02E 60/145; Y02E 60/147; F28D 20/0034; F28D 20/0039; F28D 20/0043; F28D 20/0052; F24L 3/08
USPC ........... 165/45, 132, 135, 136, 902, 909, 10; 62/260; 60/641.1–641.7, 659; 405/53, 210, 405/224
See application file for complete search history.

(56) References Cited

U.S. PATENT DOCUMENTS

| | | | |
|---|---|---|---|
| 3,670,839 A | 6/1972 | Savit | |
| 3,783,615 A | 1/1974 | Hubers | |
| 3,797,973 A | 3/1974 | Prasse et al. | |
| 3,866,058 A | 2/1975 | Lenssen | |
| 3,883,273 A | 5/1975 | King | |
| 3,895,493 A | 7/1975 | Rigollot | |
| 3,896,898 A | 7/1975 | Kirby et al. | |
| 3,916,634 A | 11/1975 | Woodruff | |
| 3,970,050 A | 7/1976 | Hoadley | |
| 3,996,741 A | 12/1976 | Herberg | |
| 4,116,009 A * | 9/1978 | Daubin ..................... 114/264 |
| 4,206,601 A | 6/1980 | Eberle | |
| 4,232,983 A | 11/1980 | Cook et al. | |

(Continued)

FOREIGN PATENT DOCUMENTS

| | | |
|---|---|---|
| CA | 2027113 A1 | 4/1992 |
| CN | 2168973 Y | 6/1994 |

(Continued)

*Primary Examiner* — Travis Ruby
(74) *Attorney, Agent, or Firm* — Ziolkowski Patent Solutions Group, SC

(57) ABSTRACT

A thermal energy storage system includes a container positioned within a surrounding body of water and comprising a container wall. The wall has an interior surface exposed to and defining an internal volume of the container and has an exterior surface opposite the interior surface and exposed to the surrounding body of water. The internal volume is substantially full of water, and the container is configured to thermally separate water within the internal volume along the interior surface from water of the surrounding body of water along the exterior surface. A thermal source in thermal communication with the water within the internal volume is configured to transfer a thermal potential to the water within the internal volume.

17 Claims, 13 Drawing Sheets

(56) References Cited

U.S. PATENT DOCUMENTS

| | | | |
|---|---|---|---|
| 4,245,475 A | 1/1981 | Girden | |
| 4,289,425 A | 9/1981 | Ootsu | |
| 4,391,552 A | 7/1983 | O'Hara | |
| 4,454,721 A | 6/1984 | Hurlimann et al. | |
| 4,560,884 A | 12/1985 | Whittecar | |
| 4,848,445 A | 7/1989 | Harper | |
| 4,873,828 A | 10/1989 | Laing et al. | |
| 5,184,936 A | 2/1993 | Nojima | |
| 5,205,720 A | 4/1993 | Nagata | |
| 5,340,283 A | 8/1994 | Nagata | |
| 5,391,067 A | 2/1995 | Saunders | |
| 5,537,822 A | 7/1996 | Shnaid et al. | |
| 5,841,733 A | 11/1998 | Bouyoucos et al. | |
| 5,946,909 A | 9/1999 | Szpur | |
| 6,018,947 A | 2/2000 | DeMarco et al. | |
| 6,575,712 B1 | 6/2003 | Slavchev | |
| 6,659,065 B1 | 12/2003 | Renegar | |
| 6,748,737 B2 | 6/2004 | Lafferty | |
| 6,863,474 B2 | 3/2005 | Webster et al. | |
| 6,892,681 B2* | 5/2005 | Morikawa et al. | 123/41.14 |
| 6,964,165 B2 | 11/2005 | Uhl et al. | |
| 7,097,436 B2 | 8/2006 | Wells | |
| 7,216,483 B2 | 5/2007 | Takeuchi | |
| 7,281,371 B1 | 10/2007 | Heidenreich | |
| 7,362,490 B2 | 4/2008 | Park | |
| 7,448,404 B2* | 11/2008 | Samuelsen et al. | 137/236.1 |
| 7,470,086 B2 | 12/2008 | Jennings et al. | |
| 7,525,212 B1 | 4/2009 | Catlin | |
| 7,614,861 B2 | 11/2009 | Nagler | |
| 2002/0119010 A1 | 8/2002 | Len-Rios | |
| 2002/0178987 A1 | 12/2002 | Eagles et al. | |
| 2004/0074235 A1 | 4/2004 | Lampkin et al. | |
| 2005/0158184 A1 | 7/2005 | Lin | |
| 2006/0201454 A1* | 9/2006 | Miyata et al. | 123/41.01 |
| 2007/0006586 A1 | 1/2007 | Hoffman et al. | |
| 2007/0089682 A1 | 4/2007 | Mariansky | |
| 2007/0130929 A1 | 6/2007 | Khan et al. | |
| 2007/0234749 A1 | 10/2007 | Enis et al. | |
| 2007/0295673 A1 | 12/2007 | Enis et al. | |
| 2008/0012344 A1 | 1/2008 | Buffard et al. | |
| 2008/0034756 A1 | 2/2008 | Spalte | |
| 2008/0226480 A1 | 9/2008 | Ferran et al. | |
| 2008/0260548 A1 | 10/2008 | Ahdoot | |
| 2009/0021012 A1 | 1/2009 | Stull et al. | |
| 2009/0158740 A1 | 6/2009 | Littau et al. | |
| 2009/0178384 A1 | 7/2009 | Nakhamkin | |
| 2009/0230696 A1 | 9/2009 | Enis et al. | |

FOREIGN PATENT DOCUMENTS

| | | |
|---|---|---|
| CN | 1296327 A | 5/2001 |
| CN | 2924492 Y | 7/2007 |
| CN | 200949502 Y | 9/2007 |
| CN | 101158329 A | 4/2008 |
| CN | 101302751 A | 11/2008 |
| CN | 101368395 A | 2/2009 |
| CN | 201212166 Y | 3/2009 |
| DE | 3720872 A1 | 1/1989 |
| DE | 4307094 A1 | 9/1994 |
| EP | 1638191 A2 | 3/2006 |
| EP | 1734255 A1 | 12/2006 |
| EP | 1764494 A1 | 3/2007 |
| ES | 2089955 A2 | 10/1996 |
| FR | 2866096 A1 | 8/2005 |
| FR | 2885961 A1 | 11/2006 |
| GB | 1213112 A | 11/1970 |
| GB | 2013318 A | 8/1979 |
| GB | 2020375 A | 11/1979 |
| GR | 1005210 B2 | 5/2006 |
| JP | 54011517 A | 1/1979 |
| JP | 55109772 A | 8/1980 |
| JP | 56010897 A | 2/1981 |
| JP | 56077568 A | 6/1981 |
| JP | 56148682 A | 11/1981 |
| JP | 57008363 A | 1/1982 |
| JP | 58214608 A | 12/1983 |
| JP | 60037316 B | 8/1985 |
| JP | 63239320 A | 10/1988 |
| JP | 1018266 B | 4/1989 |
| JP | 1177838 A | 7/1989 |
| JP | 2071053 A | 3/1990 |
| JP | 2071054 A | 3/1990 |
| JP | 2271080 A | 11/1990 |
| JP | 5294387 A | 11/1993 |
| JP | 6050109 A | 2/1994 |
| JP | 6173841 A | 6/1994 |
| JP | 7317649 A | 12/1995 |
| JP | 9070238 A | 3/1997 |
| JP | 9149564 A | 6/1997 |
| JP | 2000175377 A | 6/2000 |
| JP | 2006077719 A | 3/2006 |
| JP | 2008309014 A | 12/2008 |
| JP | 2009525432 A | 7/2009 |
| JP | 2010011732 A | 1/2010 |
| KR | 20030031012 A | 4/2003 |
| KR | 20040092336 A | 11/2004 |
| KR | 1020050076176 A | 2/2007 |
| KR | 20070115019 A | 12/2007 |
| RU | 2321776 C1 | 4/2008 |
| SG | 2006060149 A1 | 3/2008 |
| TW | 200831777 A | 8/2008 |
| TW | 200842250 | 11/2008 |
| WO | 7901154 A1 | 12/1979 |
| WO | 7901158 A1 | 12/1979 |
| WO | 2001033150 A1 | 5/2001 |
| WO | 03078812 A1 | 9/2003 |
| WO | 2008045468 A1 | 4/2008 |
| WO | 2009005383 A1 | 1/2009 |
| WO | 2009015419 A1 | 2/2009 |
| WO | 2009024933 A2 | 2/2009 |

* cited by examiner

Prior Art

SYSTEM AND METHOD FOR STORING THERMAL ENERGY

CROSS-REFERENCE TO RELATED APPLICATION

The present application claims priority to U.S. Provisional Application 61/364,364 filed Jul. 14, 2010, and to U.S. Provisional Application 61/364,368 filed Jul. 14, 2010, the disclosures of which are incorporated herein.

BACKGROUND OF THE INVENTION

Embodiments of the invention relate generally to thermal energy storage and, more particularly, to a system and method of storing thermal energy in an underwater storage device.

Renewable energy (RE) sources offer an alternative to conventional power sources in an age of dwindling non-renewable energy sources and high carbon emissions. However, RE sources are often not fully exploited because many forms of renewable energy are not available when the peak demand is present. For instance, RE sources may be most available during undesirable off-peak hours, or may be located in areas that are remote from population centers or locations where power is most needed, having to share the grid during peak hours along with all the other peak power sources.

RE sources may include hydro power, geothermal, Ocean Thermal Energy Conversion (OTEC), as examples. Hydro power, for instance, when combined with a reservoir is one RE source that can be throttled up and down to match or load-follow the varying power loads. Geothermal and OTEC are also good baseload RE resources; however, viable locations for geothermal and OTEC are limited. It is to be understood that an ocean thermal energy converter, while traditionally utilized across the thermocline of an ocean, can additionally apply to fresh bodies of water that have a temperature difference between surface water and deep water. RE sources may also include solar, wind, wave, and tidal, as examples. However these sources tend to be intermittent in their ability to provide power. Energy storage is thus desired for those sources to substantially contribute to the grid energy supply.

Cost-effective storage for the electrical grid has been sought from the beginning of electrical service delivery but is not yet available. In the absence of affordable storage, the variation in power demand throughout a day, and season-to-season, requires generation assets that are utilized only part of the time, which can increase capital, operations, and maintenance costs for assets used at less than full capacity. Also, some generation assets are difficult to throttle or shut down and are difficult to quickly return to full power. Energy storage can provide a buffer to better match power demand and supply allowing power sources to operate at higher capacity and thus higher efficiency.

Compressed air energy storage (CAES) is an attractive energy storage technology that overcomes many drawbacks of known energy storage technologies. One approach for CAES is illustrated in FIG. 1. CAES system 10 includes an input power 12 which can be, for example, from a renewable energy source such as wind power, wave power (e.g., via a "Salter Duck"), current power, tidal power, or solar power, as examples. In another embodiment, input power 12 may be from an electrical power grid. In the case of a renewable energy (RE) source, such a source may provide intermittent power. In the case of an electrical power grid, system 10 may be connected thereto and controlled in a fashion that electrical power may be drawn and stored as compressed fluid energy during off-peak hours such as during late evening or early morning hours, and then recovered during peak hours when energy drawn from system 10 may be sold at a premium (i.e., electrical energy arbitrage), or to augment base load power systems such as coal to provide peaking capability by storing inexpensive base load power.

Input power 12 is coupled to mechanical power 14 to compress fluid from a fluid inlet 16, and fluid compression 18 results. Cooling may be introduced via pumps and heat exchangers or through direct contact between the compressed fluid and a cooling fluid. Fluid from fluid compression 18 is conveyed to compressed fluid storage 20 via a fluid input 22.

When it is desirable to draw stored energy from system 10, compressed fluid may be drawn from compressed fluid storage 20 via fluid output 24, and fluid expansion 26 occurs, which results in available energy that may be conveyed to, for instance, a mechanical device that extracts mechanical power 28 for electrical power generation 30. The generated electrical power may be conveyed to a grid or other device where it is desirable to have electrical power delivered. Outlet fluid 32 is expelled to the environment at generally standard or ambient pressure.

When operated close to isothermally (i.e., quasi-isothermally), system 10 includes forced-convection cooling 34 to cool the fluid from fluid compression 18 and forced-convection heating 36 to heat the fluid from fluid expansion 26. Because compressed fluid storage occurs at generally ambient temperature and pressure, both cooling 34 for fluid compression 18 and heating 36 after fluid expansion 26 may be performed using the vast amount of environmental fluid that surrounds system 10 at ambient temperature and pressure.

FIG. 2 illustrates a marine-based, quasi-isothermal implementation of CAES system 10. Components of system 10 are positioned on a platform 38 proximately to the water surface of a sea 40. Platform 38 is supported by the seafloor 42. A compressed air storage assembly 44 is positioned at an average depth 46, and a compressor/expander system (C/E) 48 is coupled to a generator 50. C/E 48 may include multiple stages of compression and expansion for quasi-isothermal operation, and a heat exchanger package (not shown in this figure) may cool or reheat the fluid between the stages of compression or expansion, respectively.

A fluid hose or pipe, or pressurized-fluid conveyance system 52 connects fluid storage bag assembly 44 with the C/E 48 at or near the surface of sea 40. When power is input 54 to C/E 48, C/E 48 operates to compress fluid, convey it to fluid storage tube assembly 44 via fluid hose or pipe 52, and store the energy therein. Power 54 may be provided via a renewable source such as wind, wave motion, tidal motion, or may be provided via the generator 50 operated as a motor which may draw energy from, for instance, a power grid. Also, C/E 48 may be operated in reverse by drawing compressed stored energy from fluid storage tube assembly 44 via fluid hose or pipe 52 to drive the generator 50 to generate AC or DC power.

While operation of CAES system 10 in a marine-based quasi-isothermal operation takes advantage of the generation of energy from cost-effective sources, quasi-isothermal CAES systems typically compress fluid in a plurality of compression stages, and with cooling or heating within or between stages achieved via pumps and heat exchangers. An adiabatic CAES system, however, allows for storing thermal energy generated during fluid compression, which is not disposed of but used subsequently to preheat the compressed air prior to or during fluid expansion.

If there are enough compression stages, the system can operate at close to isothermal efficiency simply by exchange enough heat with the external environment. However, a compression system with a large number of stages may be quite expensive.

In newer, adiabatic CAES designs, thermal energy is stored at high temperatures that require expensive media and containment systems. For example, one proposal for thermal storage includes the use of thermal storage containers filled with stone or ceramic bricks, stored at 600° C. Such a high temperature system is challenging and expensive to enclose and insulate. Water, on the other hand, has very high heat capacity, is very inexpensive, but is challenging to use as a storage medium because of its relatively low boiling point at low or moderate pressures.

It would be advantageous to have thermal energy storage systems that incorporate water or other low cost, non-toxic liquids as the energy storage medium. Given that thermal energy storage systems can be deployed both on land and offshore, or partly on land and partly offshore, it would be advantageous to have thermal energy storage systems which can incorporate low cost thermal storage in both environments.

BRIEF DESCRIPTION

According to one aspect of the invention, a thermal energy storage system includes a container positioned within a surrounding body of water and comprising a container wall. The wall has an interior surface exposed to and defining an internal volume of the container and has an exterior surface opposite the interior surface and exposed to the surrounding body of water. The internal volume is substantially full of water, and the container is configured to thermally separate water within the internal volume along the interior surface from water of the surrounding body of water along the exterior surface. A thermal source in thermal communication with the water within the internal volume is configured to transfer a thermal potential to the water within the internal volume.

According to another aspect of the invention, a method of deploying a thermal energy storage system includes positioning a thermal storage container within a body of water. The thermal storage container includes a wall having a first surface facing a first volume positioned within an interior of the container and a second surface opposite from the first surface and facing the body of water. The method also includes thermally coupling a thermal source to an entrained volume of water substantially filling the first volume, the thermal source configured to transfer heat to the entrained volume of water. The wall is configured to impede a transfer of thermal energy therethrough from the body of water to the entrained volume of water.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Embodiments of the invention incorporate a pressure-modifying device with multiple stages, operating with both adiabatic and quasi-isothermal elements. In the compression phase, the device provides several stages of compression to a gas, with the heat of compression being removed after each stage, thus managing the temperature rise in each stage. This heat of compression is then captured in a thermal energy store which can therefore be operated at relatively modest temperatures compared to a fully-adiabatic system with thermal storage. In expansion phase, the same pressure-modifying device operating in reverse, or in other embodiments, a different pressure-modifying device, provides several stages of expansion to the previously compressed gas, with heat being added to the gas before each stage of expansion. In other embodiments heat may be extracted or added to the gas during each stage rather than between stages.

If the air is compressed from an ambient temperature of 20° C. and 1 atm to a pressure of 25 atm in four stages, for example, the resulting temperature rise in each stage can be kept to 76° C., and the temperature of the thermal storage medium can be kept to under 100° C., below the boiling point of water at 1 atm. This, in conjunction with a thermal storage vessel comprising primarily thin films of inexpensive polymer and possibly earth or water that is already on site, can allow for a very low cost CAES system with thermal energy storage where the thermal storage medium in the thermal storage vessel is stored at relatively low pressure differences relative to ambient pressure.

In various embodiments where the thermal storage vessel is under water, or where the thermal storage vessel is a pressure vessel, it is possible to design the system with fewer stages and to use as the storage medium water at a higher temperature. For example, if the thermal storage vessel is at a depth of 90 meters, with roughly 10 atm of pressure, the maximum operating temperature may be as high as 180° C.

Embodiments of the invention include deployment or installation of a thermal energy storage vessel and a body of water such as an ocean, sea, lake, reservoir, gulf, harbor, inlet, river, or any other man-made or natural body of water. As used herein, "sea" refers to any such body of water, and "seafloor" refers to the floor thereof "Sediment" (e.g., "seafloor sediment"), as used herein, refers to marine material from the bottom or floor of the sea and may include, by way of example, gravel, sand, silt, clay, mud, organic or other material settled onto the floor of the sea.

Figure 1:
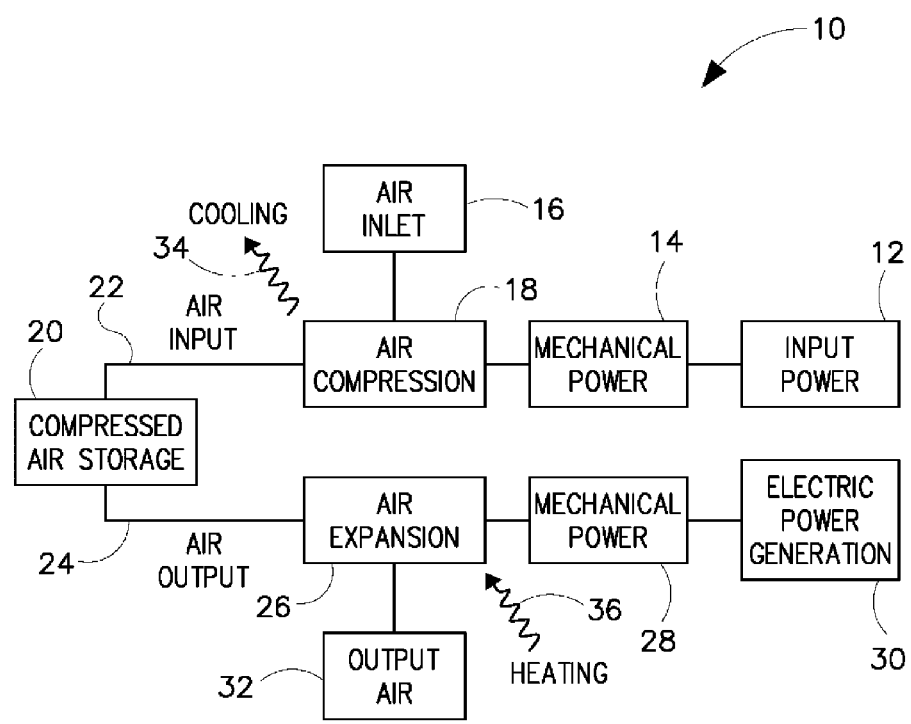
FIG. 1 is a schematic diagram illustrating a compressed air energy storage (CAES) system.
Figure 2:
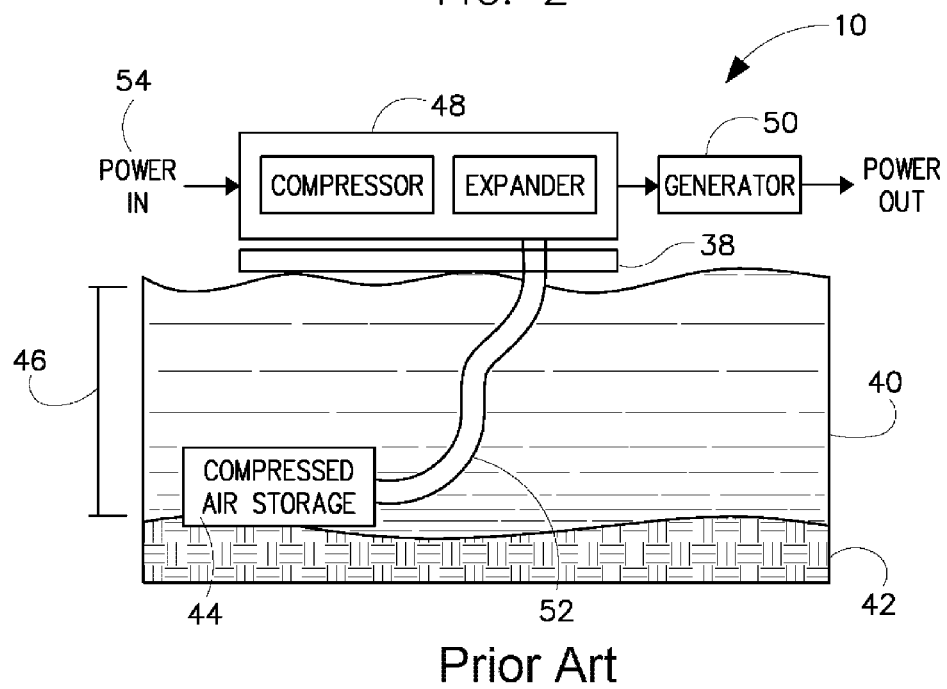
FIG. 2 is a schematic diagram illustrating a CAES system FIG. 1 in a marine environment without thermal energy storage.
Figure 3:
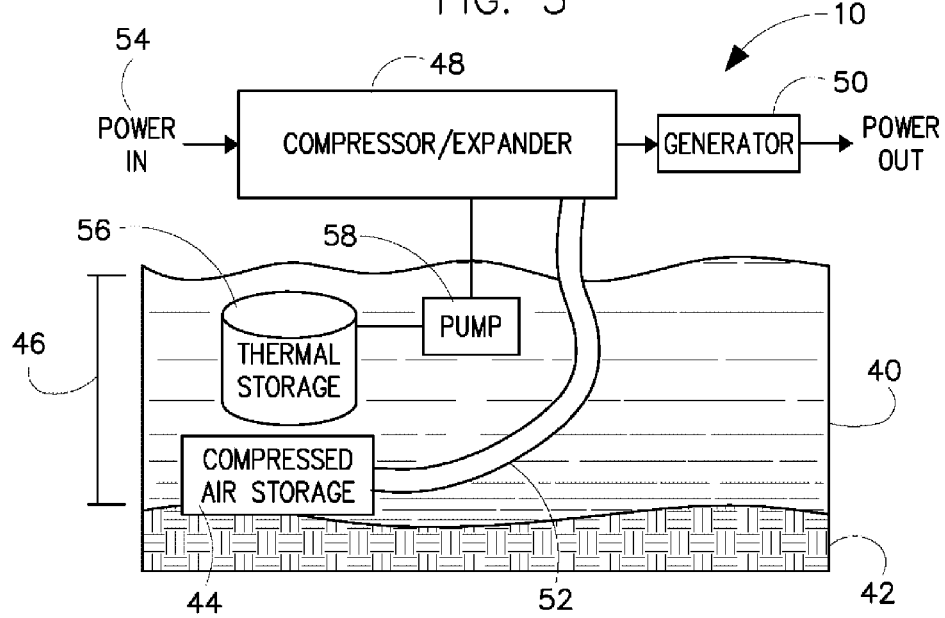
FIG. 3 is a schematic diagram illustrating an adiabatic operation of the system FIG. 1 in a marine environment according to an embodiment of the invention.

FIG. 3 is a schematic diagram illustrating an adiabatic operation of the system FIG. 1 in a marine environment incorporating an embodiment of the invention. Similar to that shown in FIG. 2, CAES system 10 includes C/E 48 coupled to power input 54 and to generator/motor 50. C/E 48 is also coupled via fluid hose 52 to compressed air storage 44, which rests on the seafloor 42.

In contrast to that shown in FIG. 2, CAES system 10 of FIG. 3 incorporates a thermal storage vessel 56 having a thermal storage medium for storing heat generated during the fluid compression stage of C/E 48. A pump 58 is thermally coupled to C/E 48 and is designed to facilitate a heat transfer between the compression fluid in C/E 48 and the thermal storage medium of thermal storage vessel 56. As described in embodiments hereinbelow, the heat transfer between the working fluid and the thermal storage medium may occur adjacently to C/E 48 or adjacently to thermal storage vessel 56. Embodiments of the invention will describe the thermal storage medium herein as using water, either freshwater or saltwater, for the thermal storage medium. However, other thermal storage fluid media such as other aqueous solutions or other liquids like glycol or oil may also be used.

During adiabatic operation, thermal storage vessel 56 is operated in such a fashion that thermal stratification occurs therein; thus, hot water may be fed to and drawn from the top of thermal storage vessel 56, and cold water may be fed to and drawn from the bottom of thermal storage vessel 56. Thus, in one example, during compression, cold water could be drawn from the bottom (relatively cold) portion of the vessel 56 and returned after compression to the top (relatively hot) portion. Conversely, during expansion, hot water could be drawn from the top (relatively hot) portion of the vessel 56 and returned to the bottom (relatively cold) portion or optionally not returned to the vessel at all, just back to the surrounding water. Thus, in both C/E modes of operation, stable stratification of the thermal storage tank is achieved, preserving the thermal differences of the water portions due to low inherent thermal diffusivity of water under stable conditions.

Figure 4:
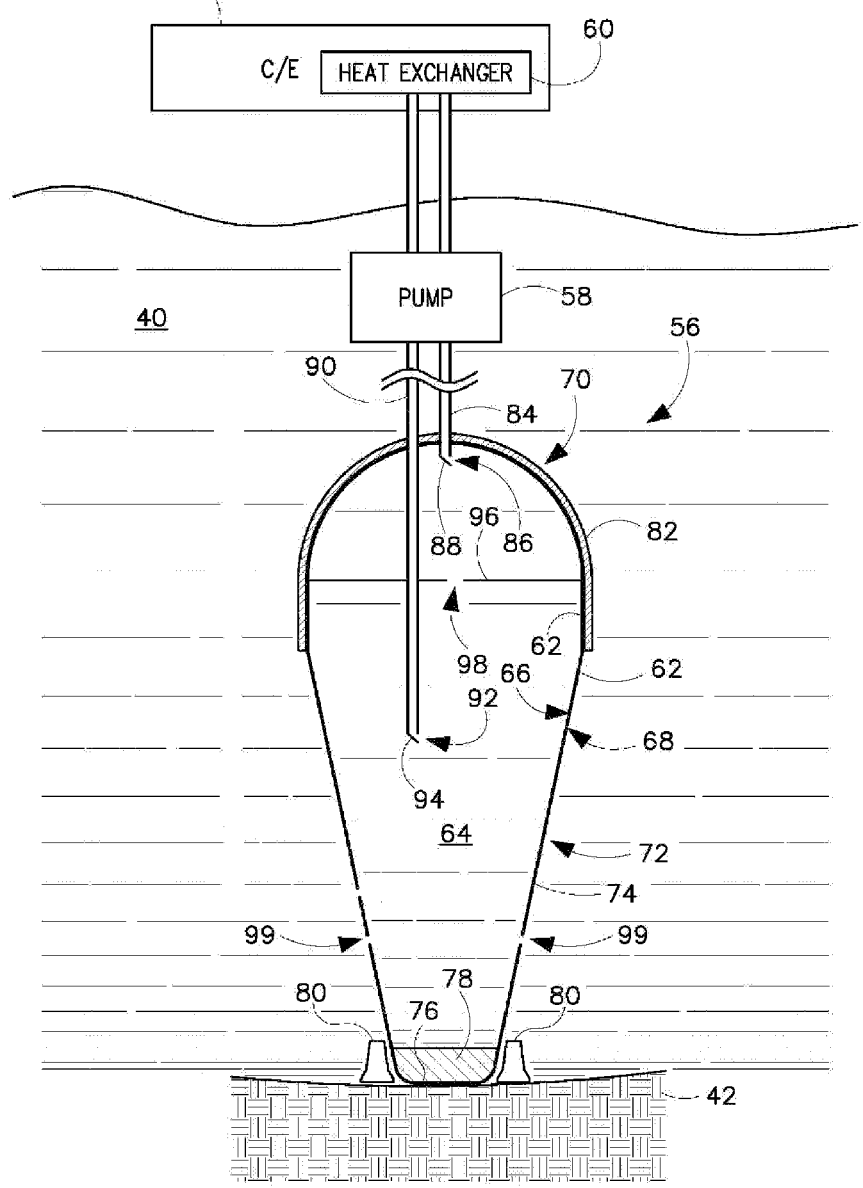
FIG. 4 is a schematic diagram illustrating a thermal storage vessel thermally coupled to a heat exchanger according to an embodiment of the invention.

FIG. 4 is a schematic diagram illustrating thermal storage vessel 56 thermally coupled to a heat exchanger 60 according to an embodiment of the invention. Thermal storage vessel 56 includes a wall 62 forming or bounding an enclosed internal volume 64 substantially filled with water, which in this embodiment, is the thermal storage medium. An interior surface 66 of wall 62 faces enclosed volume 64, and an exterior surface 68 of wall 62 faces the surrounding body of water. Wall 62 is constructed so as to thermally separate the water within enclosed volume 64 along interior surface 66 from water at ambient temperature along the exterior surface 68. Thermal transfer between the interior and exterior surfaces 66, 68 can occur, however, albeit at a slower rate than a direct contact between the water volumes.

In one embodiment, wall 62 is constructed of a collapsible material such as a fabric material or a polymer film. The fabric material or the polymer film may incorporate embedded tensile members to increase its strength and stiffness in either a particular direction or in all directions. In another embodiment, wall 62 may be constructed of discrete tensile members (e.g., cables) with an overlay layer or interconnected by thin flexible sections of material.

Wall 62 includes a top portion 70 forming a dome shape. In one embodiment, the dome shape creates a substantially ellipsoidal dome. Dome 70 is configured to contain the hottest portion of the water within enclosed volume 64. Forming top portion 70 into a dome reduces wrinkles in wall 62 as well as provides high structural support and less heat transfer surface per unit volume.

Figure 5:
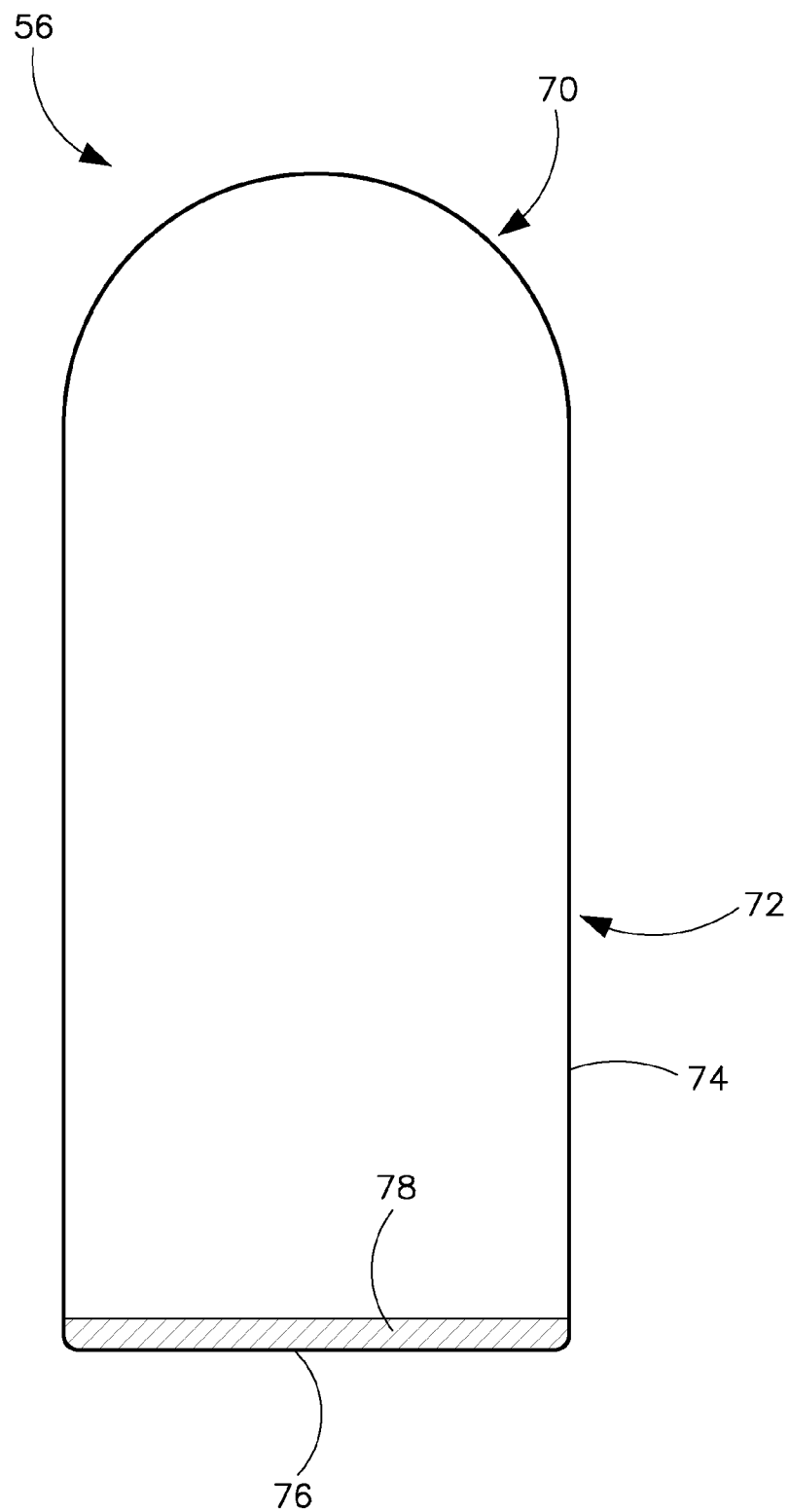
FIG. 5 is a cross-sectional view of the thermal storage vessel of FIG. 4 according to another embodiment of the invention.

A bottom portion 72 of wall 62 includes a side wall 74 coupled to a bottom wall 76. As shown in side wall 74 is conical, and the diameter thereof diminishes as it approaches bottom wall 76. However, other shapes for side wall 74 are contemplated. For example, referring to FIG. 5, side wall 74 is cylindrical.

Referring back to FIG. 4, thermal storage vessel 56 may be ballasted with a heavy ballast material 78 to supply weight and friction so as to counteract a force applied thereto due to a buoyancy of the water within the internal volume 64 or due to currents in the surrounding body of water, for example. In one embodiment, ballast material 78 includes sediment dredged from near the deployment site or from another site on the seafloor. In another embodiment, ballast material 78 includes materials non-native to the seafloor that are heavier or more dense than water such as, for example, sand, gravel, stone, iron ore, concrete, slag, scrap materials, and the like. In addition to ballast material 78, one or more barriers 80 may be positioned about bottom wall 76 to act as a chock to keep the ballast filled part of the vessel 56 from sliding across the seafloor.

Figure 6:
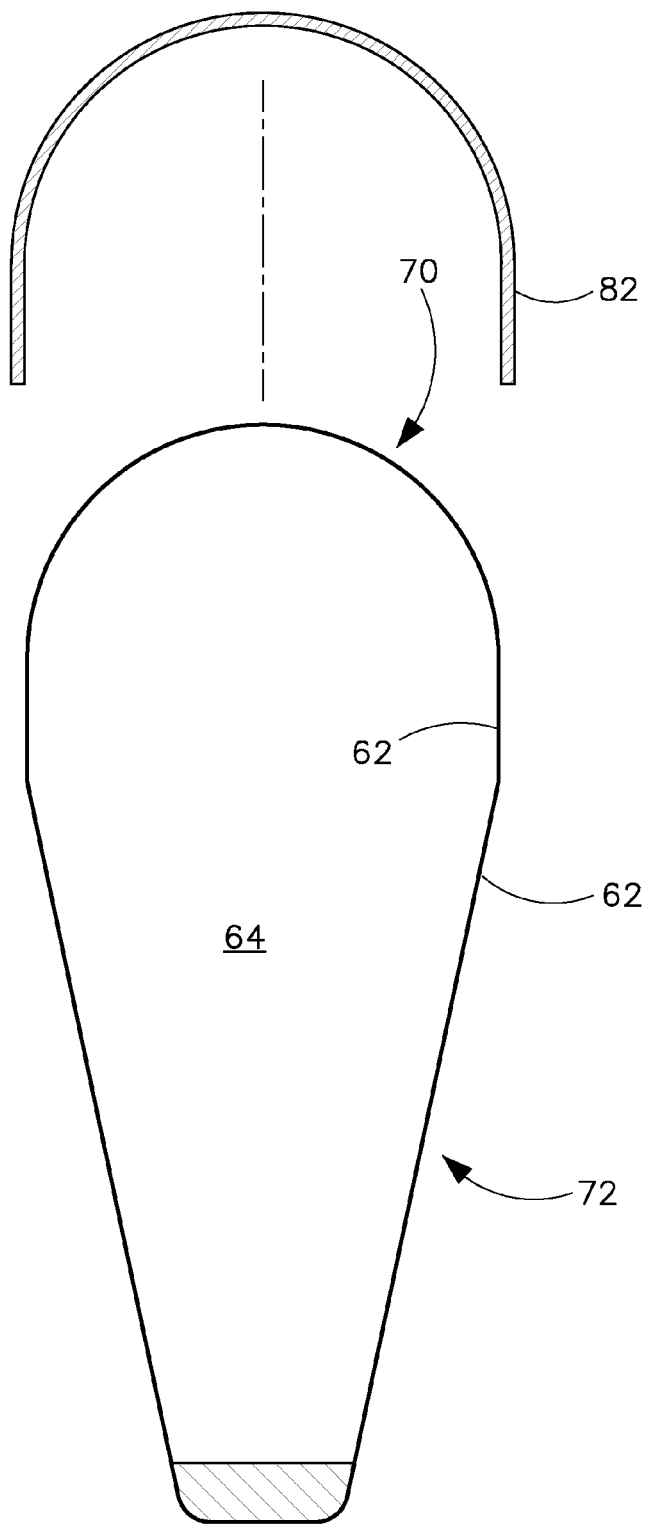
FIG. 6 is an exploded view of the thermal storage vessel of FIG. 4 according to an embodiment of the invention.

Referring to FIGS. 4 and 6, an insulation material 82 is coupled to and positioned adjacent to wall 62 so as to increase a thermal insulation of the water within the enclosed volume 64 from the water in the surrounding environment. Insulation material 82 may be constructed of one or more, insulative materials such as those described below with respect to FIG. 9, for example. These insulative materials may be collapsible. Insulation material 82 may thus increase the insulation of top portion 70 configured to contain the hottest water while leaving bottom portion 72 more free to exchange heat with the external environment. The bottom portion 72 may alternatively contain insulation to protect cold storage from the ambient temperature of the environment in cases where the cold fluid is significantly colder than ambient temperature.

Referring again to FIG. 4, a hot pipe 84 extends from pump 58 into enclosed volume 64, and an opening 86 of hot pipe 84 is positioned to draw in hot water from enclosed volume 64 or to output hot water to enclosed volume 64. To reduce a vertical mixing of the water in enclosed volume 64 when hot water is output from hot pipe 84, an end flow plate 88 coupled to hot pipe 84 near opening 86 directs the output flow substantially horizontally, or in one or more directions perpendicular to the direction of heat gradient within enclosed volume 64. In some embodiments, there is no end flow plate 88. A cold pipe 90 extends from pump 58 into enclosed volume 64, and an opening 92 of cold pipe 90 is positioned to draw in cold water from enclosed volume 64 or to output cold water to enclosed volume 64. Cold pipe 90 may also include an end flow plate 94 to direct the cold water output flow to be substantially horizontal. According to another embodiment as shown in phantom, cold pipe 90 may pass through thermal storage vessel 56 via side wall 74 at a level of temperature gradient substantially equal to an expected input/output temperature of cold water passing through cold pipe 90. To further reduce or impede a vertical mixing of water temperatures, top portion 70 may include one or more baffles 96 having an opening 98 or openings to manage the vertical flow in sections of the volume 64.

In some embodiments, using the surrounding water at ambient temperature as the cold reservoir might be beneficial, and, therefore, the cold water interface pipe 90 could terminate in the ambient, surrounding water rather than inside the vessel as shown in phantom. In these embodiments, holes 99 (shown in phantom) in side wall 74 allow the water in bottom portion 72 to flow in and out, accommodating hot water removed or added to top portion 70. The warm water in top portion 70 remains isolated from the ambient or cooled water by thermal stratification (and the associated differential liquid density) and by baffling 96 if included. As long as the openings 99 to the external water are positioned lower than the lowest point that the warm water may reach, the warm water will remain in the enclosure 56.

Heat exchanger 60 is positioned within or adjacently to C/E 48 such that a heat transfer occurs between the working fluid of C/E 48 and the fluid inside heat exchanger 60. In this embodiment, pump 58 pumps water from enclosed volume 64 through heat exchanger 60 to transfer heat into or out of the water. For example, during a compression stage of C/E 48, pump 58 may draw cold water through cold pipe 90 and supply the cold water to heat exchanger 60 to transfer heat from the compression heat into the cold water. Accordingly, the cold water is heated, and pump 58 may then supply the hot water through hot pipe 84 to the top of enclosed volume 64. In one embodiment, heat exchanger 60 is configured to transfer heat into the water to raise a temperature of the water above its 1 atmosphere boiling point (~100° Celsius). While this temperature is above the boiling point of water at normal atmospheric pressure, the ambient water pressure at the position of thermal storage vessel 56 in the sea 40 allows the high temperature water to remain in the liquid state at higher pressure. During an expansion stage of C/E 48, the process may be reversed to draw hot water from one portion of enclosed volume 64 and to supply cold water to another portion thereof.

According to an embodiment of the invention, the water in enclosed volume 64 may be salt water or fresh water. Advantages to using fresh water include less corrosion of the heat transfer system components and simpler component construction than that required to endure salt-water exposure.

Figure 7:
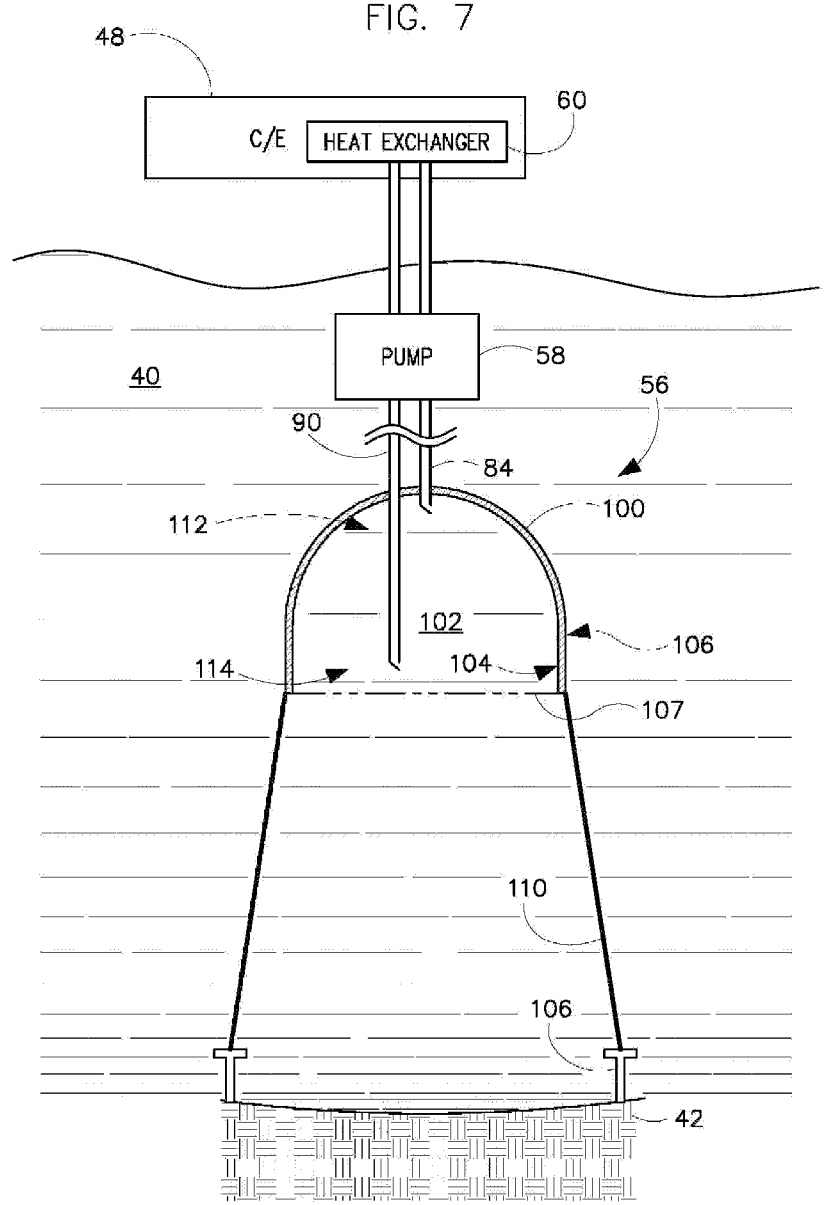
FIG. 7 is a schematic diagram illustrating a thermal storage vessel thermally coupled to a heat exchanger according to another embodiment of the invention.

FIG. 7 is a schematic diagram illustrating thermal storage vessel 56 thermally coupled to heat exchanger 60 according to an embodiment of the invention. Thermal storage vessel 56 includes a hemispherical or ellipsoidal wall 100 defining or bounding an open internal volume 102 substantially filled with water, which in this embodiment, is the thermal storage medium. An interior surface 104 of wall 100 faces internal volume 102, and an exterior surface 106 of wall 100 faces the surrounding body of water. Wall 100 is constructed so as to thermally insulate the water within internal volume 102 along interior surface 104 from water of the surrounding body of water along the exterior surface 106. Insulation material 82 may be constructed of one or more collapsible, insulative materials such as those described below with respect to FIG. 9, for example. Thermal transfer between the interior and exterior surfaces 104, 106 is, therefore, significantly reduced.

At the bottom of the internal volume 102, there may be a baffling or a skin 107 (shown in phantom), which would reduce the rate of mixing of the water in internal volume 102 with the surrounding water, which may contain currents. In some embodiments, this skin 107 may be designed to be watertight and, together with wall 100, provides a complete enclosure around the internal volume 102.

FIG. 7 also shows another anchoring embodiment coupleable to thermal storage vessel 56. A plurality of anchors or pylons 108 may be affixed into the seafloor, and a plurality of anchor cables 110 coupled between anchors 108 and thermal storage vessel 56 secure the buoyancy of thermal storage vessel 56 as well as its position relative to cross currents in the surrounding body of water.

Similar to that shown in FIG. 4, hot pipe 84 extends into a top portion 112 of thermal storage vessel 56. Cold pipe 90 may extend into a bottom portion 114 of thermal storage vessel 56 in one example. According to another example, since water from the ambient environment is allowed to enter internal volume 102 due to a withdrawal of hot water therefrom, cold pipe 90 may extend into the surrounding body of water.

Figure 8:
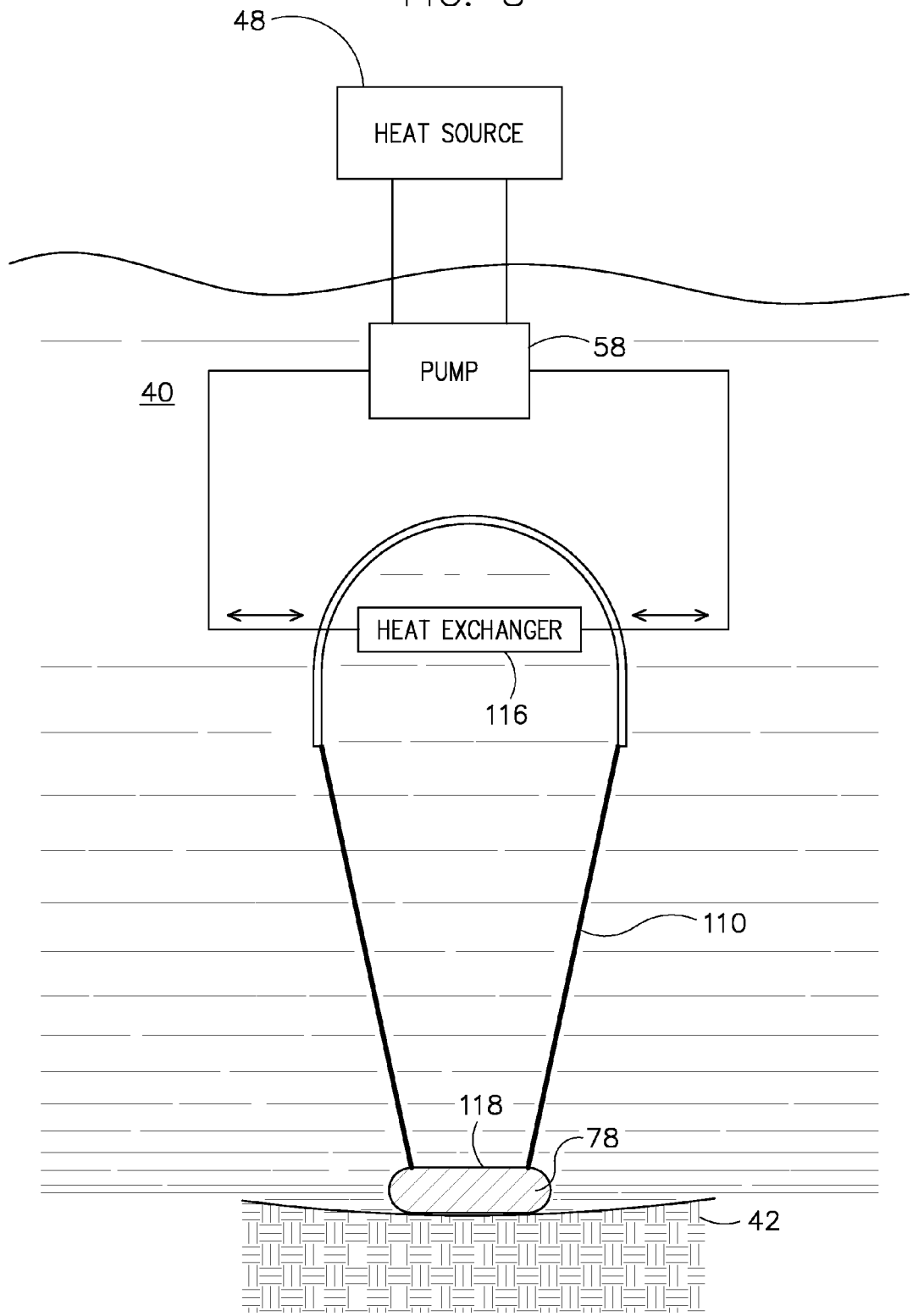
FIG. 8 is a schematic diagram illustrating the thermal storage vessel of FIG. 7 thermally coupled to a heat exchanger according to another embodiment of the invention.

FIG. 8 is a schematic diagram illustrating thermal storage vessel 56 of FIG. 7 thermally coupled to a heat exchanger 116 according to another embodiment of the invention. FIG. 8 illustrates that the location of heat exchange between the water in internal volume 102 with the working fluid of thermal source 49C/E is within internal volume 102 itself rather than at C/E 48 as illustrated in FIG. 4 or 7. In this embodiment, pump 58 is configured to cause the working fluid of C/E 48 to flow through thermal storage vessel 56 and into heat exchanger 116 to heat or cool the water in internal volume 102. In some embodiments, the heat source may have its own pumping function to move the working fluid through the circuit and heat exchanger 60. In this manner, de-stratification of thermal gradients established in internal volume 102 is not enhanced via the intake or output of water from a hot or cold pipe.

FIG. 8 also shows an alternative anchor 118 coupleable to thermal storage vessel 56. Anchor 118, in one example, includes a bag filled with ballast material 78 native or non-native to the seafloor such as that described above. In another example, anchor 118 may be any weighted object sufficiently heavy to substantially maintain a position of thermal storage vessel 56 when subjected to translational forces.

Figure 9:
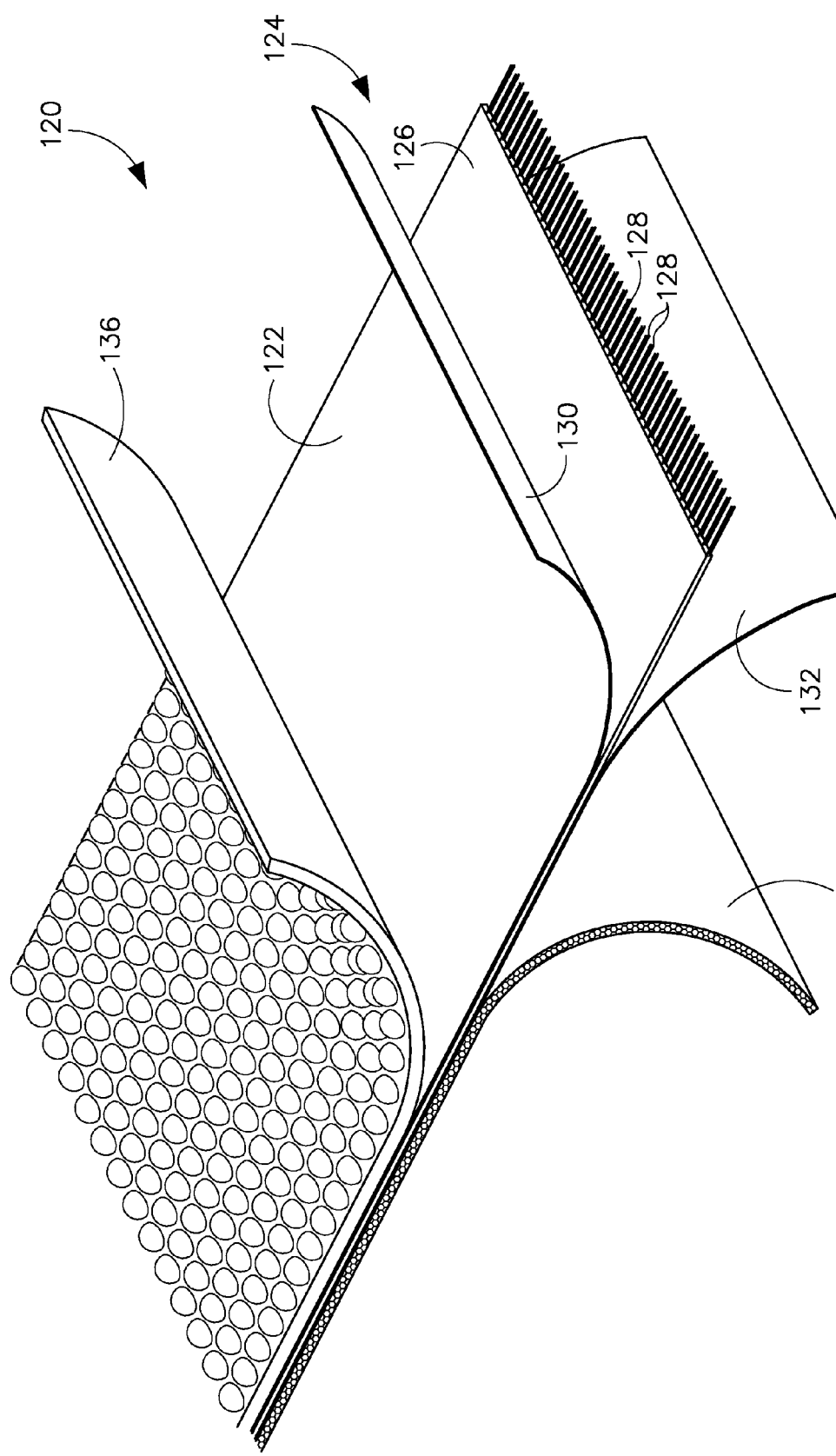
FIG. 9 is a view illustrating a multi-layer wall of a thermal storage vessel according to an embodiment of the invention.

FIG. 9 illustrates a multi-layer wall 120 of thermal storage vessel 56 according to an embodiment of the invention. FIG. 9 is not necessarily drawn to scale. Wall 120 includes a first layer 122 constructed of a collapsible, fiber-reinforced polymer film. The film is a fiber reinforced polymer matrix 124 of, for example, ~55% fibers 128 encapsulated (such as by hot rolling, for example) in layers of common thermoplastic 126 on both sides. Such a matrix 124 structure may be about 0.14 mm thick (0.055"), for example. This type of matrix 124 allows for a thin, inexpensive, scalable, and very robust vessel for marine applications. The thermoplastic material 126 may be plastics such as LDPE (low-density polyethylene), HDPE (high-density polyethylene), PVC (polyvinyl chloride), PET (polyethylene terephthalate), or polyester, as well as a fluoropolymer. Other materials are also contemplated. The material may also be made of mixed material plastics or of recycled plastic from fluid storage tubes removed from use or operation, for example, where such fluid storage tubes are removed from an installation so as to leave nothing of the removed fluid storage tube at the installation site. Other recyclable plastic sources are also contemplated.

The fibers 128 may be constructed from materials such as glass, carbon, or metal fibers, for example, and are oriented into a directional composite laminate, the direction of which may correspond to one or more directions of principal stress, as an example. Fiberglass, for example, is very inexpensive and is generally very tolerant of long-duration water immersion. Fiberglass is also widely used in the marine industry specifically for its durability, reliability, longevity, suitability for the marine environment, and tolerance of saltwater. Various types of glass fibers each have their own advantages in different applications. In one example, the glass fibers may be a relatively expensive S-2 glass material, which may be optimized for tensile strength. In another example, the glass fibers may be an E-glass material.

The fiber 128 is an important structural element in the thermal storage vessel 56. The tensile strength of the fibers may be on the order of one-hundred times higher than the thermoplastic matrix that will be used. The tension of the fiber opposes the buoyancy force of the thermal storage fluid with the force from the anchoring system (the weight of the sediment ballast for example) and the resultant axial stress in the vessel. These tensions need only be carried vertically through the vessel 56. For any fiber material used, the design protects the fiber 128 from the sea water. Attempting to achieve the material strength from the plastic alone may substantially increase the cost of manufacture, and the resulting thickness may not be adequately flexible or collapsible.

The matrix material of thermoplastic fiber reinforced polymer matrix 124 actually exposed to seawater has been extensively used in seawater environments. The fibers 128 will not be directly exposed to seawater under normal conditions, since they are embedded in the thermoplastic fiber reinforced polymer matrix 124 and then laminated top 130 and bottom 132 to fully encapsulate the fibers 128. The material for outer laminations 130, 132 is generally the same as thermoplastic material 126 in thin "face sheets" to fully encapsulate fibers 128.

The fiber reinforced polymer matrix 124 material is also designed to be repairable. For example, if a hole or a tear develops in the material 124, the hole may be patched by re-joining the material 124 around the hole or by attaching a patch of the same material or another attachable patch to the material around the hole. In the case of deep deployment, such a patch may be applied by a remotely operated vehicle instead of a diver.

A second layer 134 of wall 120 includes an insulation material constructed of a polymer material entraining a gas. In another embodiment, the polymer material entrains nitrogen, thus forming a neoprene-type insulation material. A third layer 136 of wall 120 includes another insulation material constructed of a polymer material entraining a gas. In one embodiment, the polymer material of third layer 136 entrains air, thus forming a type of bubble wrap insulation material.

As shown, first layer 122 is positioned between second layer 134 and third layer 136. Other embodiments include positioning one or more insulation layers on only one side of first layer 122.

Embodiments of the invention include design and operation of thermal storage vessels with existing marine CAES systems in addition to other non-CAES systems where storage of thermal energy under water is desirable. An underwater thermal storage vessel according to an embodiment of the invention allows for the manufacture and deployment of a low-cost thermal storage system.

Figure 10:
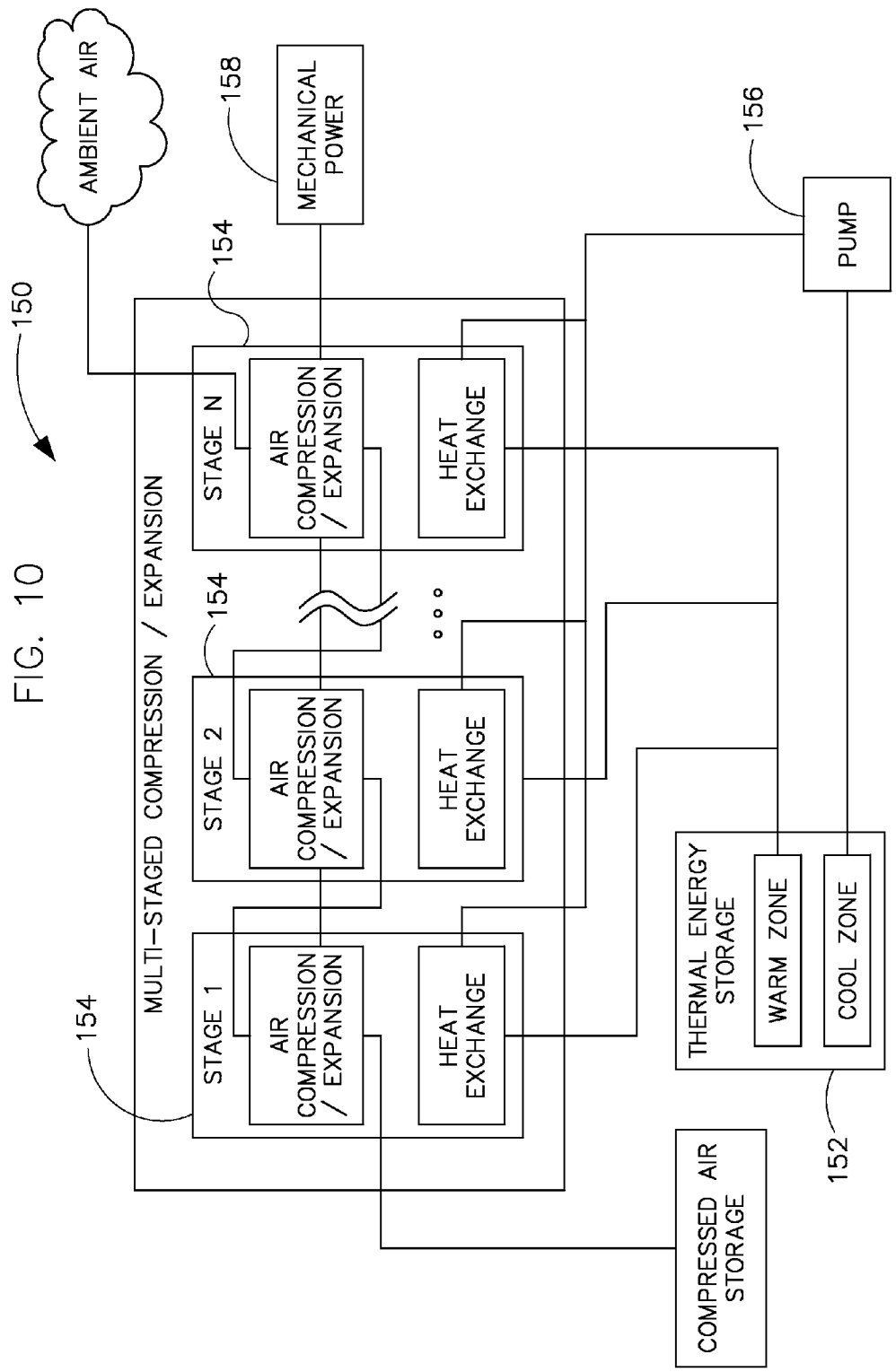
FIG. 10 is a process flow diagram illustrating a multi-staged compression and expansion system according to an embodiment of the invention.

There are thermal energy storage (TES) structures that can be created not in the water as well. FIG. 10 illustrates a generic process diagram where a multi-staged compression and expansion system 150 harvests thermal energy from the compression process, stores it in a thermal energy storage medium, and then provides that heat to an expansion process. The thermal energy storage medium is stored in a thermal enclosure 152 such as a thermal enclosure as described above, for example. The compression/expansion process is shown with the different elements nested inside. The number of stages 154 selected for the application may vary depending on the ultimate pressure that the air is compressed to and the desired maximum temperature in the thermal energy storage 152. It is shown with a generic N number of stages 154. Inside each stage 154 there is a compression step and a heat-exchange process for a compression sequence. The heat exchange may be sequential (that is, heat may be removed from the compressed air after compression) or in some embodiments, the heat exchange may be simultaneous with the compression. The air is compressed in series. That is, the same air goes from one stage 154 to the next—with the pressure increasing with each step. A typical embodiment of the heat exchange is where a manifold of cooler thermal material is provided to all the stages 154 in parallel. That is, the thermal material only goes through one stages 154, so if there were five stages, for example, there are five parallel flows generally fed from a common cool zone in the TES 152 and similarly combined together to and injected into the warm zone in the TES 152 at a common temperature. A pump 156 is used to circulate the thermal material throughout the stages 154. Mechanical power 158 is used to drive the compressed air through the system.

The expansion process is, in general, a reversal of the compression process. In fact, in some embodiments, the same equipment, simply running from the high-pressure source back to ambient generating mechanical power may be used. The heat exchange process is similar as in the compression process except that the heat drawn from the TES 152 is added before or simultaneous with the expansion (in contrast with after or simultaneous in the compression mode). Again, the air pressure is sequentially modulated, and the thermal material is provided in parallel to the heat exchange process.

Figure 11:
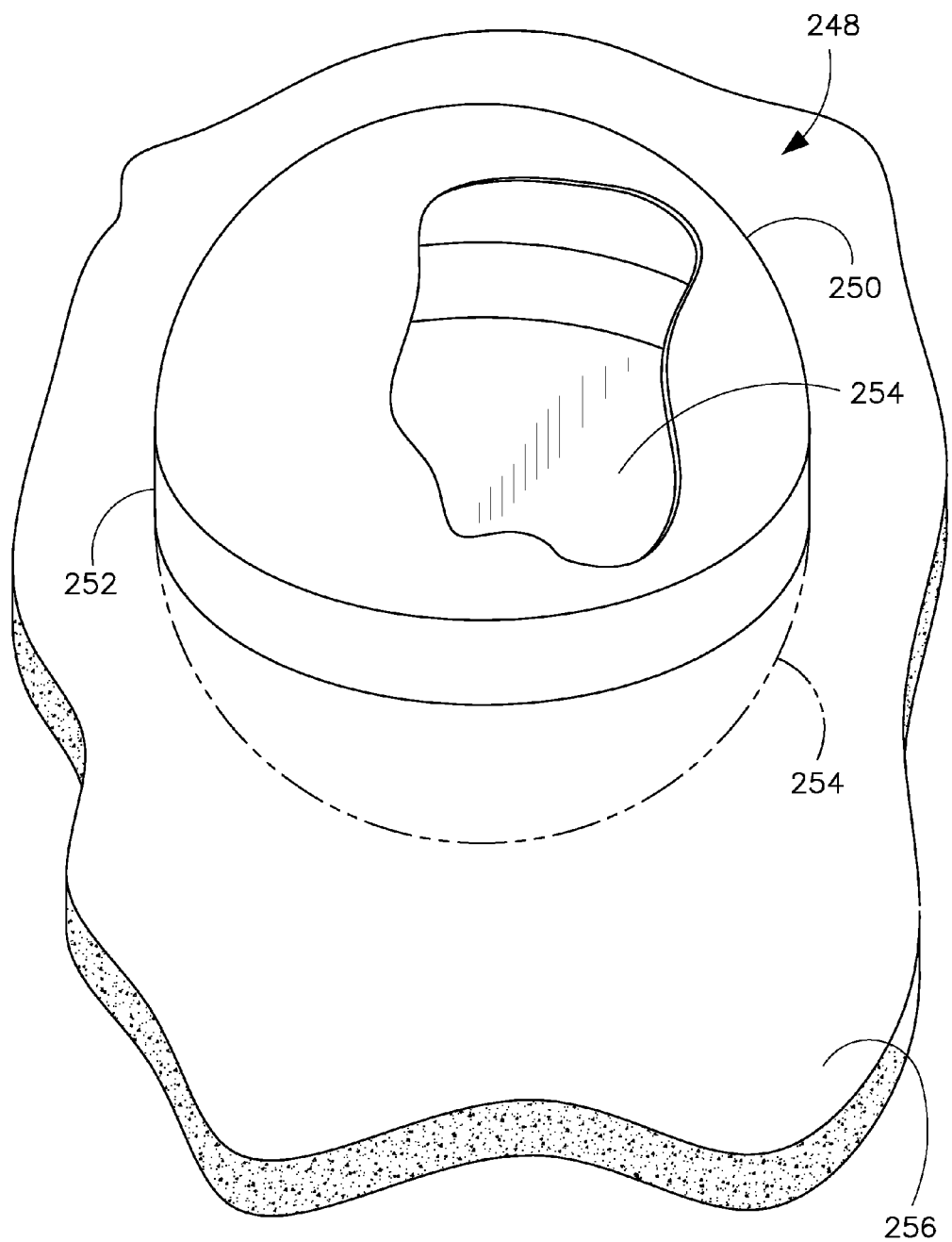
FIG. 11 is an isometric view of a thermal enclosure according to an embodiment of the invention.

FIG. 11 illustrates a thermal enclosure 248 with a domed top 250, a cylindrical wall 252, and a base 254. Such a structure could be placed on grade or on a supporting surface 256 such as the ground. In one embodiment, base 254 may be curved or domed, and thermal enclosure 248 may be positioned below grade such that at least a portion of thermal enclosure 248 extends below the surface of supporting surface 256. Such large-scale thermal enclosures 248 can be constructed with reasonable costs that have good structural and thermal insulation properties. Extra insulation may be added to increase the thermal insulation capability of thermal enclosure 248.

Figure 12:
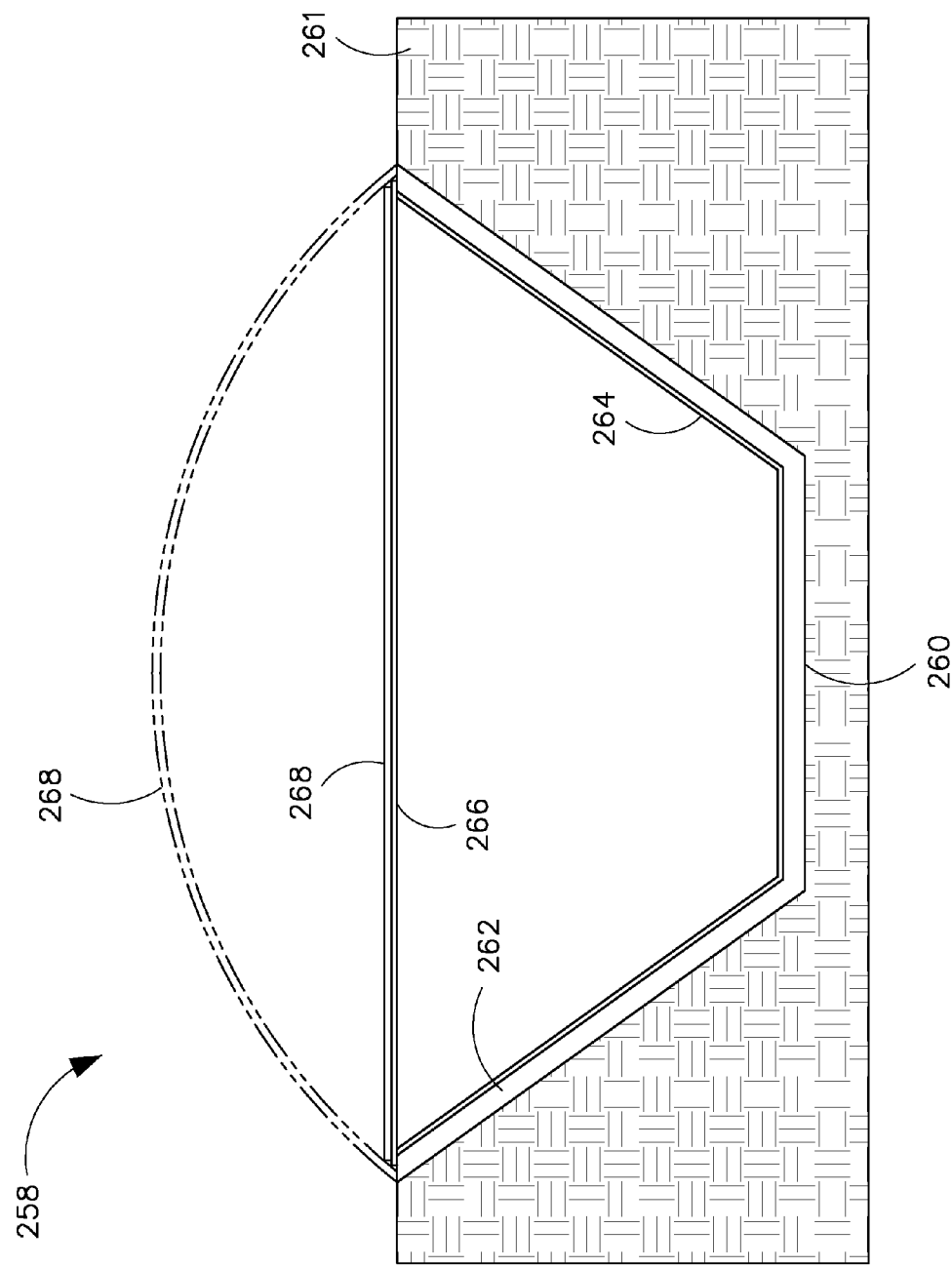
FIG. 12 is a section view of a thermal enclosure according to another embodiment of the invention.

FIG. 12 illustrates one example of a thermal storage tank 258 that is below grade. A depression or excavation 260 is formed below ground 261 and may be filled with an insulating material 262, such as a foam (e.g., polyisocyanurate) or a generally natural insulating material like a low conductivity mineral (e.g., vermiculite or diatomaceous earth) or straw. Dry earth may also be used, is relatively inexpensive, and may already be present at the base of the depression or excavation 260. On top of the insulation material 262 is placed a waterproof liner 264, which could be similar to a geotextile or simple thermoplastic film or sheet much like those used to line landfills. Alternatively, liner 264 can be comprised of tilt-up or other simple concrete structures that are familiar to those of skill in the art. Consideration of the temperatures of the water or thermal material could affect the liner material selection. Butyl liners are commonly used for some solar hot water tanks and comprise suitable material in some situations. One important heat loss mechanism is evaporative cooling. A water vapor-resistant cover 266 substantially reduces evaporative heat loss. If the storage medium to be used in tank 258 is not going to operate with temperature above its boiling temperatures at external ambient pressure, then the structure of cover 266 does not need to be strengthened due to the vapor pressure of the storage medium. For such cases, cover 266 could be a similar membrane as the liner 264 as it will experience similar temperatures. In some embodiments, the design of tank 258 is able to handle storage medium temperatures above the ambient boiling point of the storage medium. In these situations, cover 266 may be configured to be able to withstand a substantial amount of vapor pressure. In some embodiments, a domed cover structure 266 may used as shown in phantom. In some embodiments, the domed cover structure 266 can be constructed of concrete. In others, where the vapor pressure is lower, the cover 266 may be constructed of a thin, flexible membrane. In some embodiments, one or more layers of additional insulation 268 is present. The cover 266 of the enclosure 258 may have condensing thermal storage material on its bottom, which generally has high heat transfer coefficients. A layer of insulation 268 could take the form of a polymeric material entraining a gas, such as bubble wrap, spray-on polyurethane foam, or neoprene. It could be a fibrous material such as straw or fiberglass. It could also be a layer of insulation against radiative heat loss, such as a thin reflective sheet of aluminum-coated PET. Bubble wrap is also commonly used to reduce radiative heat loss in these applications, as a part of aluminum-coated laminated assemblies. Insulation layer 268 may have features that help it to withstand elements of the external environment such as weather conditions, solar radiation, high winds, and precipitation. In some embodiments, such features include supporting one or more portions of the cover layer 268 at elevations higher than its edges to shed precipitation and provide some interstitial support in high winds. The layer 268 may have several layers where the inner insulating layer is optimized for resisting the heat and moisture of the heat storage medium, an additional low cost insulation layer, and then an external layer with UV resistance, external waterproofing, and sufficient strength and stiffness for coping with winds and other climate elements.

Figure 13:
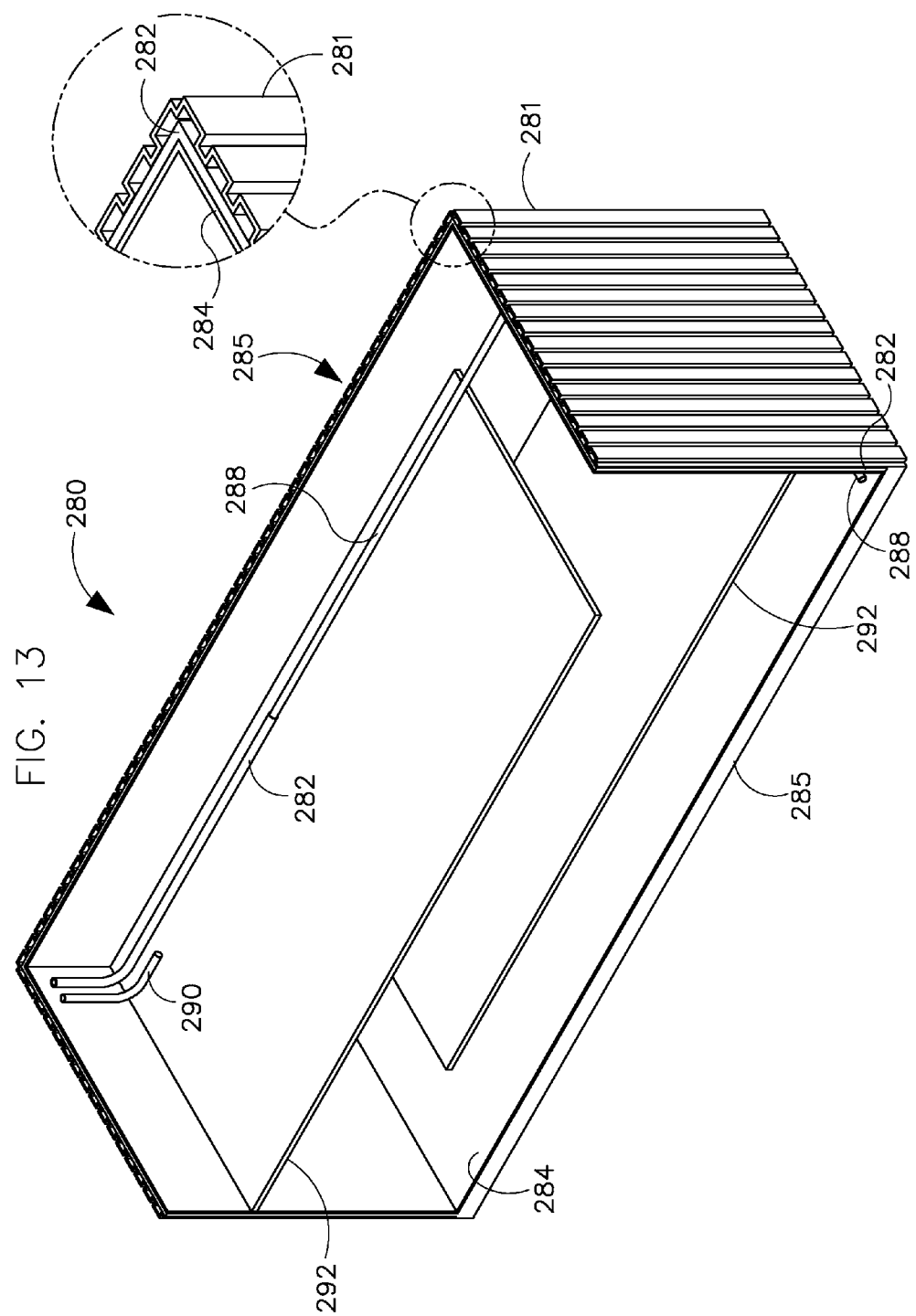
FIG. 13 is an isometric view of a thermal enclosure according to another embodiment of the invention.

FIG. 13 illustrates a self-contained thermal enclosure 280, utilizing an ISO shipping container as a shell for supporting the interior components. In other embodiments, the enclosure may be another container of standard ISO shipping container size and incorporating handling interfaces for extra modularity. The view is a section view with a top wall and side wall removed to help illustrate the components of thermal enclosure 280. Insulation 282 may be placed against the walls 281 of the enclosure. A liner 284 on the sides 283 and floor 285 can be a single piece that keeps the insulation 282 dry. A similar insulation 282 liner material 284 may be placed on the top and side walls not shown. In this embodiment, hot and cold lines or pipes 290, 288 enter the enclosure 280 near each other for ease of plumbing to the rest of the system. The cold pipe 288, in this embodiment, is then routed to the bottom of the tank 280 by one of several possible paths. It can be beneficial to have the hot and cold pipes 290, 288 access areas near the top and bottom of the tank 280, respectively, to maximize thermal potential in the thermal enclosure 280. The cold line 288 can be insulated inside the enclosure to reduce heat exchange if it traverses a warmer section of the thermal fluid to be used in enclosure 280. Either the cold line 288 or the hot line 290 may be insulated as well, outside the enclosure. Two baffles 292 are shown that can assist with maintaining thermal stratification, though in different embodiments there may be more or fewer baffles 292.

Figure 14:
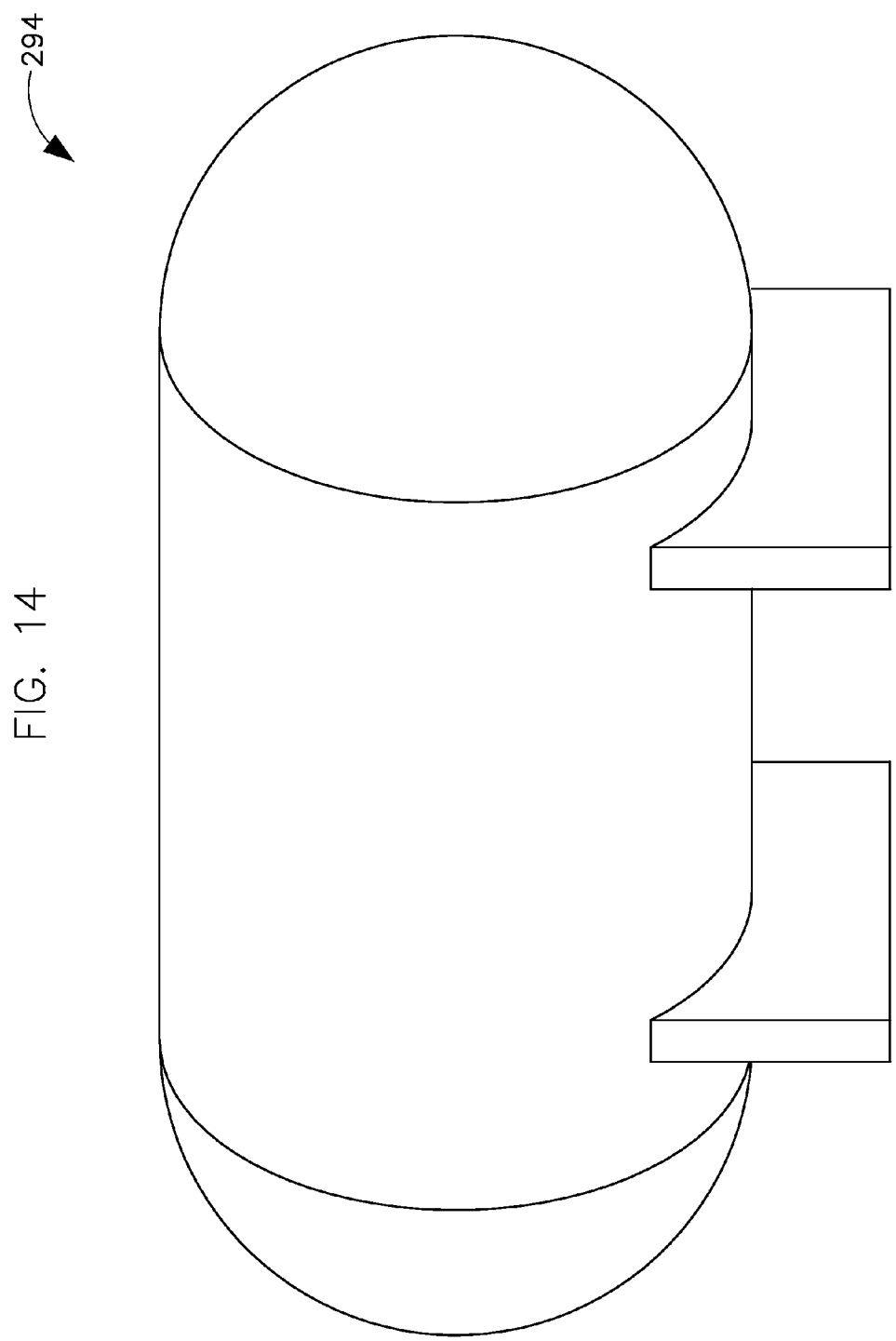
FIG. 14 is an isometric view of a thermal enclosure according to another embodiment of the invention.

FIG. 14 illustrates an insulated pressure vessel 294. One advantage of this design is the high maximum temperatures that can be achieved. Using widely available propane tanks with water as the storage medium, for instance, would allow peak temperatures of ~220 deg C. This is more than a factor of two higher than the temperature rise from ambient to maximum storage temperature compared to a vessel incapable of significant internal pressure. It also comes with a more expensive vessel. However, the management of the input temperatures by design of the multi-stage pressure-modifying system allows for the temperature rise and thus the vessel costs to be reasonable.

In one embodiment, multiple pressure vessels 294 may be packaged in a rectangular, prismatic arrangement by nesting the containers 294 together—with the interstitial volumes between and around the round tanks 294 as air gap insulation or filled with insulation. The combined assembly could then be placed in an ISO-sized container, and multiple containers can be combined to build a bigger and highly efficient thermal storage system.

One key factor that generally improves thermal isolation and therefore heat loss when storing heat is maximizing the volume of the storage to the surface area of the thermal enclosure. As such there is marginal benefit to designing shapes with aspect ratios near unity, for example spheres or cubes. For the embodiments where a modular thermal enclosure is used like those shown in FIG. 13, multiple thermal enclosures could be stacked and packaged very close together to reduce the external surface areas exposed to the ambient temperatures by sealing the seams between the containers the walls that are adjacent to other modules. In this way, high volumes to effective external surface areas can be achieved even with smaller sub elements and less ideal shapes.

Therefore, according to an embodiment of the invention, a thermal energy storage system includes a container positioned within a surrounding body of water and comprising a container wall. The wall has an interior surface exposed to and defining an internal volume of the container and has an exterior surface opposite the interior surface and exposed to the surrounding body of water. The internal volume is substantially full of water, and the container is configured to thermally separate water within the internal volume along the interior surface from water of the surrounding body of water along the exterior surface. A thermal source in thermal communication with the water within the internal volume is configured to transfer a thermal potential to the water within the internal volume.

According to another embodiment of the invention, a method of deploying a thermal energy storage system includes positioning a thermal storage container within a body of water. The thermal storage container includes a wall having a first surface facing a first volume positioned within an interior of the container and a second surface opposite from the first surface and facing the body of water. The method also includes thermally coupling a thermal source to an entrained volume of water substantially filling the first volume, the thermal source configured to transfer heat to the entrained volume of water. The wall is configured to impede a transfer of thermal energy therethrough from the body of water to the entrained volume of water.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A thermal energy storage system comprising:
   a container positioned within a surrounding body of water and comprising a container wall having:
   an interior surface exposed to and defining an internal volume of the container; and
   an exterior surface opposite the interior surface and exposed to the surrounding body of water;
   wherein the internal volume is substantially full of water;
   wherein the container is configured to thermally separate water within the internal volume along the interior surface from water of the surrounding body of water along the exterior surface;
   a pump connected to the container so as to be in fluid communication therewith, the pump configured to pump water from the internal volume and pump water to the internal volume;
   a heat exchanger connected to the pump and in fluid communication with the pump and the container; and
   a compressor and expander system in thermal communication with the water within the internal volume and configured to transfer a thermal potential to the water within the internal volume via the heat exchanger and the pump.

2. The system of claim 1 wherein the container wall is collapsible.

3. The system of claim 2 wherein the container wall comprises one of a fabric material and a polymer film.

4. The system of claim 2 further comprising an insulation material coupled to and positioned about a first portion of the container so as to increase a thermal insulation of the first portion, with a second portion of the container remaining uncovered by the insulation material so as to remain free to exchange heat with the surrounding body of water.

5. The system of claim 4 wherein the insulation material comprises a polymer material entraining a gas.

6. The system of claim 4 wherein the insulation material comprises a multi-polymer layer material, wherein a space between each polymer layer allows water from the body of water to be positioned between each polymer layer.

7. The system of claim 2 wherein the container comprises a substantially ellipsoidal dome.

8. The system of claim 2 further comprising baffling positioned within the interior volume and configured to impede circulation of the water within the interior volume.

9. The system of claim 2 wherein the thermal storage system further comprises a first pipe positioned within the container and extending a first distance from a top of the container in a first direction, the first pipe having a first end connected to the pump and a second end having an opening configured to fluidly couple an interior volume of the first pipe with an interior volume of the container.

10. The system of claim 9 wherein the thermal storage system further comprises a second pipe positioned within the container and extending a second distance from the top of the container in the first direction, the second distance being greater than the first distance;
    wherein the second pipe has a first end connected to the pump and a second end having an opening configured to fluidly couple an interior volume of the second pipe with an interior volume of the container.

11. The system of claim 10 wherein the pump is configured to:
    draw cold water through the second pipe to supply cold water from the container to the heat exchanger, so as to transfer heat into the cold water; and
    supply heated water from the heat exchanger and down through the first pipe to the container.

12. The system of claim 2, where the thermal source is a pressure-modifying device.

13. The system of claim 1 wherein the thermal source, in being configured to transfer the thermal potential, is configured to transfer heat to the water within the internal volume to raise the temperature of the water within the internal volume to a temperature exceeding its boiling point at 1 atmosphere.

14. The system of claim 1 further comprising an end flow director coupled to each of the first pipe and the second pipe at the second end thereof adjacent to the opening, the end flow director configured to direct the water to flow from the opening in a direction substantially horizontal to an orientation of the pipe.

15. The system of claim 1 wherein the compressor and expander system is operable in a first mode to compress a fluid and is operable in a second mode to expand a fluid.

16. The system of claim 15 wherein heat generated during the fluid compression performed by the compressor and expander system is stored in the water within the internal volume of the container, via the heat exchanger.

17. The system of claim 15 wherein the compressor and expander system is operated in reverse when expanding fluid in the second mode as compared to when compressing fluid in the first mode.

* * * * *